May 31, 1938. H. SAND 2,118,984
DISH DRYING PAN
Filed April 13, 1937 2 Sheets-Sheet 1
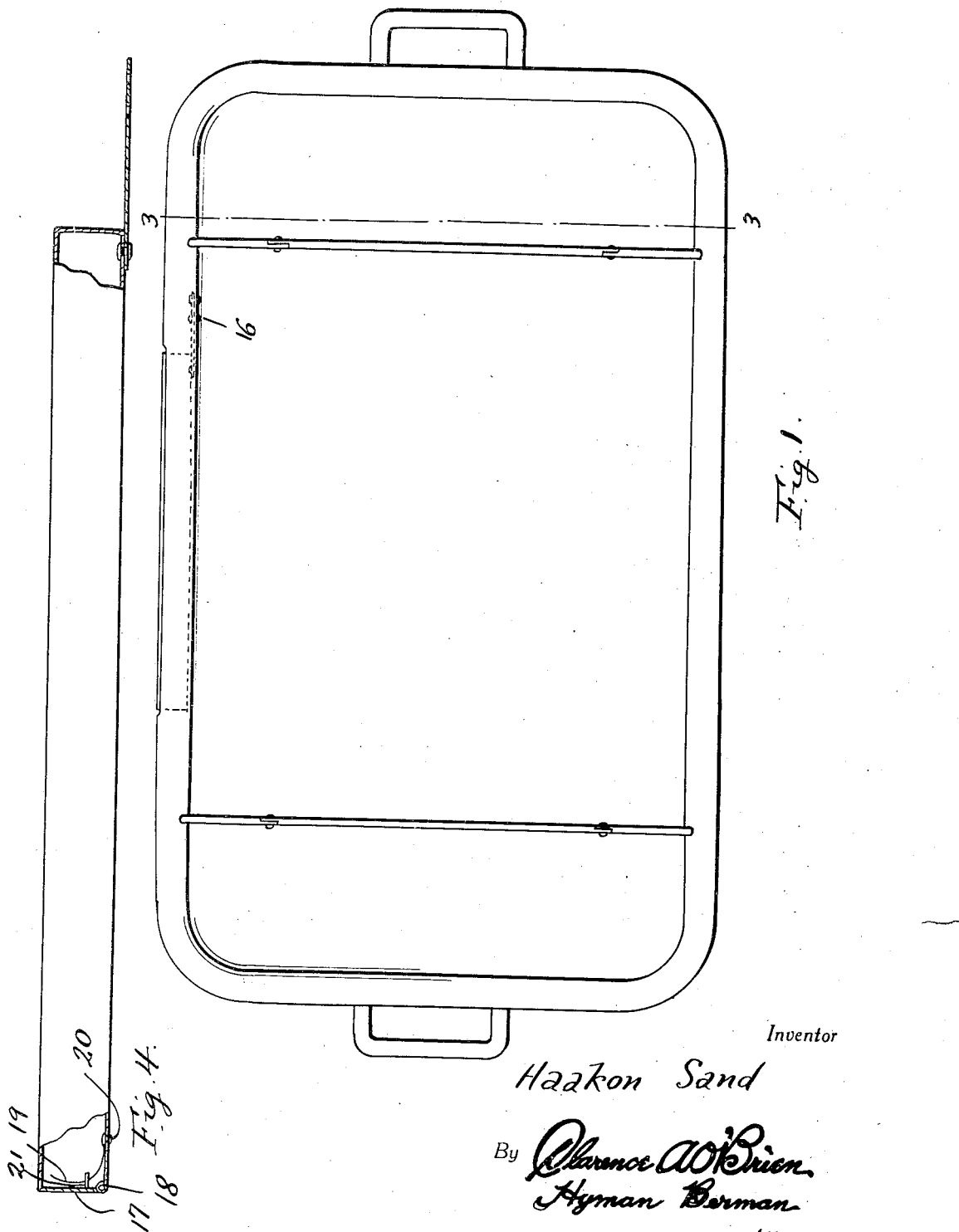
Inventor
Haakon Sand
By Clarence A. O'Brien
Hyman Berman
Attorneys

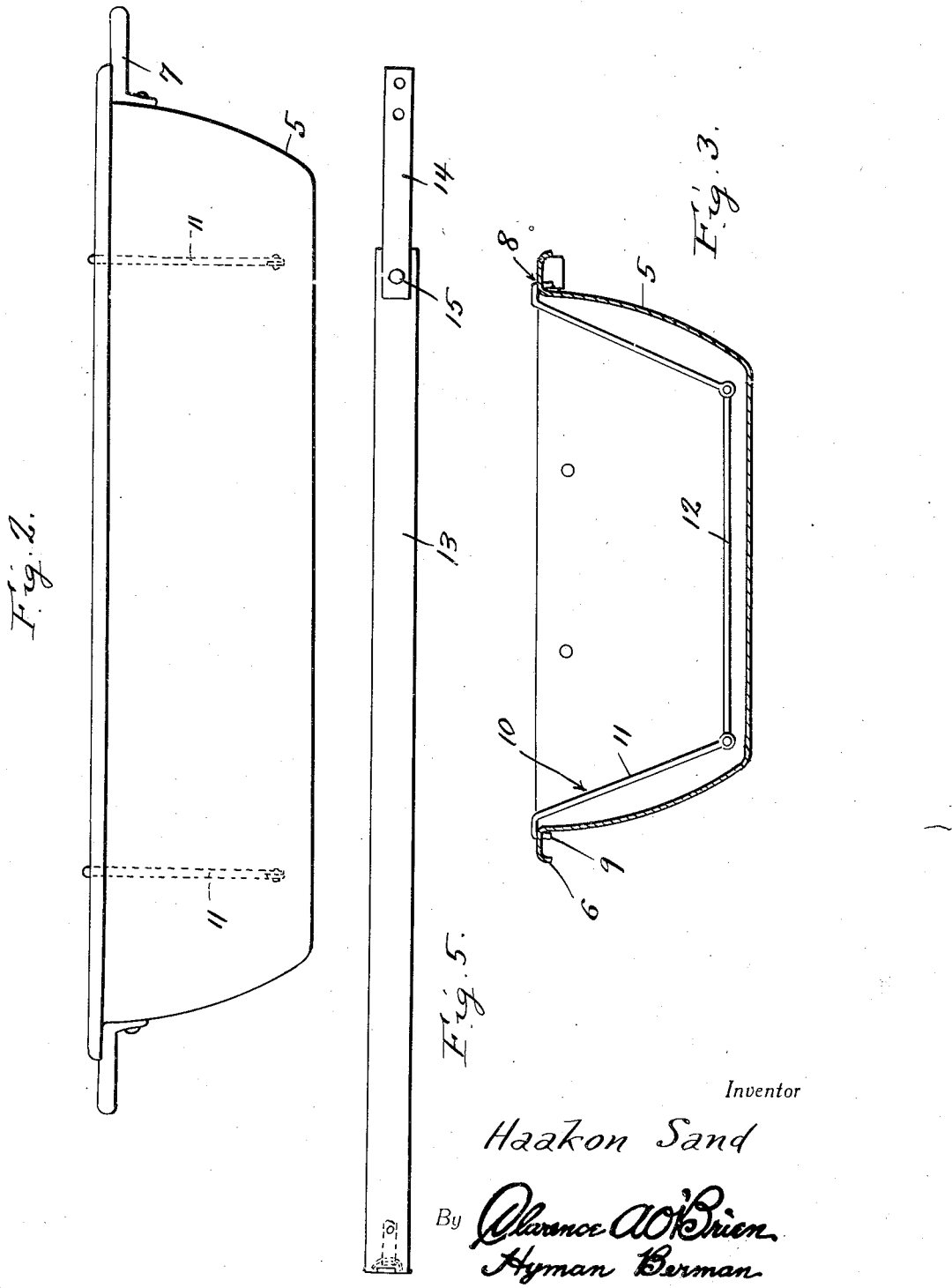

Patented May 31, 1938

2,118,984

UNITED STATES PATENT OFFICE 2,118,984

DISH DRYING PAN

Haakon Sand, Zumbrota, Minn.

Application April 13, 1937, Serial No. 136,646

1 Claim. (Cl. 141—11)

The present invention relates to dish drying pans and has for its principal object to provide a plurality of racks removably positioned in the pan to support the dishes therein while the same are drying and further to provide a container secured to the pan within which the racks may be placed when not in use.

A further object is to provide a device of this character which is simple and practical in construction, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view of the pan showing the rack in position therein.

Figure 2 is a side elevational view.

Figure 3 is a transverse sectional view taken substantially on a line 3—3 of Fig. 1.

Figure 4 is a top plan view of the container for the rack, with parts broken away and shown in section and Figure 5 is a rear elevational view of the container.

Referring now to the drawings in detail, wherein for the purpose of illustration I have disclosed a preferred embodiment of the invention the numeral 5 designates a dish pan provided with flanges 6 extending around its upper edge and also having handles 7 secured at each end thereof. The flanges 6, at diametrically opposite sides are formed with openings 8 within which the downturned ends 9 of rack 10 are removably positioned. The racks include a pair of end sections 11 having the downturned portions 9 formed at one end and extending downwardly toward the bottom of the pan, the inner ends of the end sections being pivotally connected by an intermediate section 12 whereby the end sections may be folded inwardly upon the intermediate section when the racks are removed from the pan.

A container 13 is provided for folding the racks when in collapsed position, the container being of elongated formation and substantially rectangular in cross section, and is secured under one of the flanges 6 by a metallic strap 14 riveted at 15 adjacent one end of the container, the opposite end of the strap being riveted to one of the side walls of the pan as shown at 16. One end of the container is open and provided with a door or closure 17 pivoted to the back of the container as shown at 18 and yieldably secured in closed position by a leaf spring 19 having one end secured to the container as shown at 20 and its opposite end freely threaded through an eye 21 secured to the inside of the door. As will be apparent from an inspection of Fig. 4 of the drawings the spring 19 is of an arcuate shape and by reason of its slidable engagement with the eye 21 will yieldingly maintain the door in closed position.

It is believed the details of construction and operation of the device will be readily understood from the foregoing without further detail explanation.

The present embodiment of the invention has been described in considerable detail merely for the purposes of exemplification since in actual practice it attains the features of advantage enumerated as desirable in the statement of the invention and the above description.

What is claimed is:—

In combination, a dish drying pan having flanges at its upper edge provided with openings and a dish rack positioned in the pan and including an intermediate rod-like section extending along the bottom of the pan, similar end sections pivotally connected to said intermediate section and extending upwardly along the sides of the pan, and downturned extremities on the free ends of said end sections and removably positioned in said openings.

HAAKON SAND.